Nov. 15, 1938.　　　D. S. GASKILL　　　2,136,587
FEEDING AND WATERING DEVICE
Filed Oct. 23, 1936
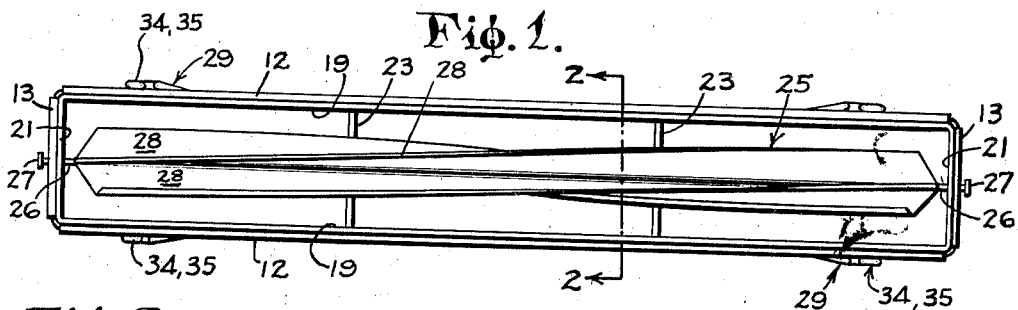
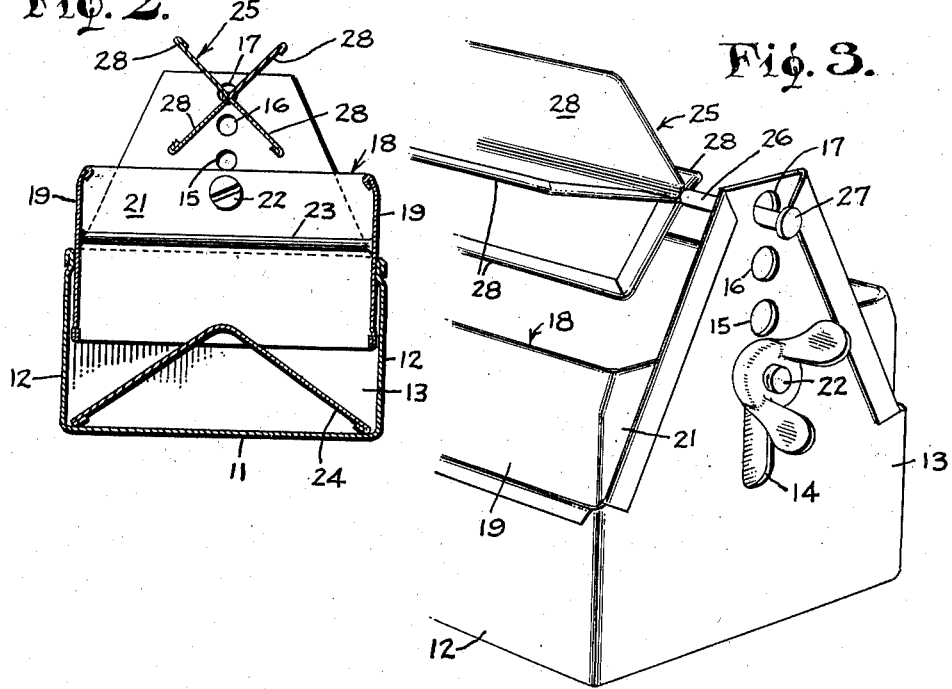
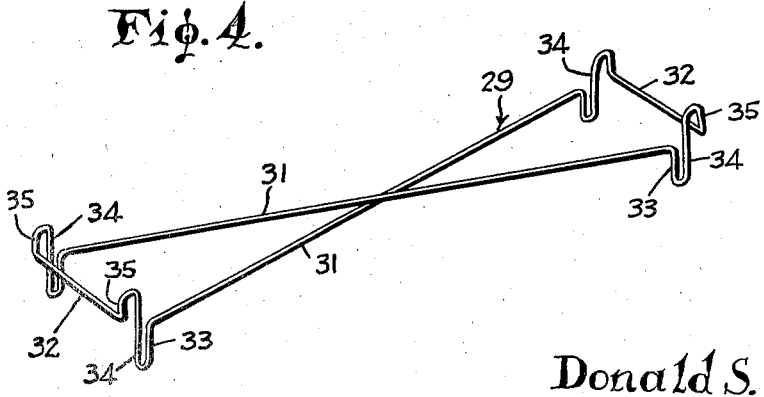
INVENTOR
Donald S. Gaskill
BY
Beau, Brooks, Buckley & Beau.
ATTORNEYS Patented Nov. 15, 1938

2,136,587

UNITED STATES PATENT OFFICE 2,136,587

FEEDING AND WATERING DEVICE

Donald S. Gaskill, Lyndonville, N. Y.

Application October 23, 1936, Serial No. 107,207

6 Claims. (Cl. 119—61)

My invention is an improved device for feeding or watering animals, particularly poultry.

The invention contemplates an elongated container provided with a doubly inclined bottom plate for causing feed to gravitate toward the sides of the container where it may readily be reached by the feeding animals, preventing the accumulation of stale feed in the center of the container, and the inclined bottom plate being removable when it is desired to increase the capacity of the device, as when feeding larger fowls or other animals. The device includes a braced, vertically adjustable frame member disposed along the inside of the container side walls, so that by adjustment the device may be made suitable for feeding creatures of different size. For example, the frame may be adjusted higher and higher to adequately compensate for the growth of young poultry feeding at the device. The invention further contemplates an improved reel or spinner member mounted above the container for preventing the feed therein from being trampled upon, the reel being so constructed as to allow feeding spaces of varying sizes along its length. Still further the invention provides a novel and efficient supporting standard for the container.

These and other objects and advantages of the invention will become apparent from the following description of the typical embodiment illustrated in the accompanying drawing, wherein:

Fig. 1 is a plan view of my improved feeding and watering device;

Fig. 2 is a transverse sectional view taken approximately along line 2—2 of Fig. 1;

Fig. 3 is a fragmentary perspective view illustrating one end of the device; and, Fig. 4 is a perspective view depicting the supporting standard.

As shown in the drawing, the device includes an open top, elongated container with bottom wall 11, upright side walls 12, 12, and upright end walls 13, 13, preferably formed of sheet metal and made water-tight at the junctures of the several walls. Then end walls 13, 13 are extended above the side walls 12, 12, and the extended portion of each end wall is provided with a substantially vertical slot 14 and above the slot with a vertical series of bearing openings, as indicated by numerals 15, 16 and 17.

A rectangular frame 18 having opposed vertical side walls 19, 19 and opposed vertical end walls 21, 21, is disposed for vertical movement with the container proper, the side walls 19, 19 of the frame sliding upon container walls 12, 12 and the end walls 21, 21 of the frame upon container end walls 13, 13. The end walls of the frame carry bolts 22 which extend through slots 14 of the container end walls, the bolts having wing nuts on their outer ends for securing the frame 18 to the container in the desired vertical elevation. Extending across the frame 18 and connecting the side walls 19, 19 thereof are a plurality of braces 23. These braces may be metal strips, rods, or tubes and are welded or otherwise rigidly secured to the walls 19, 19.

Disposed upon the bottom wall 11 of the container is an elongated plate 24 of length to fit between the end walls 21, 21 of the frame 18 and of over-all width to fit between the side walls 12, 12 of the container. The plate 24 is of inverted V-shape in cross-section, and upon removal of the frame 18 may be easily lifted from or replaced in the container for purposes to be described more fully hereinafter.

Above the container is a reel element 25 including a central rod 26 which serves as a pintle or axle, the end or pintle portions of the rod extending through the openings 15, 16 or 17 in each of the container end walls 13, 13 for bearing support and having beaded ends 27 for preventing accidental displacement from the bearing openings. Carried by and extending radially from the rod 26 are plural bars 28. In the illustrated embodiment of the invention there are four such bars 28, and the resulting spinner is of spiral formation, each bar at one end being turned at approximately ninety degrees from the other end, about the axis of the reel. As shown in Fig. 1, this spiral formation of the reel provides a greater feeding space between the edges of the spinner lobes and the side walls of the container at some points along the length of the device than at other points therealong.

The supporting standard 29 of the device, illustrated in Fig. 4 and also appearing to some extent in Fig. 1, comprises a rod or rods of metal with the ends joined together to form a continuous member, and having medial, horizontal portions 31, 31 which cross each other at their centers and form a rest for the bottom 11 of the container. The end portions 32, 32 of the standard also may engage the bottom of the container, being in substantially the same horizontal plane as the portions 31, 31. The latter terminate in downwardly and thence upwardly directed portions 33 and 34 respectively, constituting supporting legs, the portions 34 merging at their upper ends into downwardly extending portions 35 connecting to end portions 32. The upper ends of opposed portions 34, 35 at each end of the device are bent inwardly so that when the container is mounted on the supporting standard they firmly grip the side walls 12, 12 thereof to hold the parts against displacement.

In use the device may be used with or without the supporting standard 29. The latter may give desired added height to the container when placed on a solid floor, or the leg portions 33, 34 may be pressed into the ground to afford a solid foundation for the feeding or watering device.

The doubly inclined or inverted V-formation of plate 24 (used when feed instead of water is in the container) will cause feed to gravitate to an accessible position adjacent side walls 12, 12, and will prevent accumulation of stale feed in the center of the container. It also reduces the feed capacity, desirable in feeding small or young animals, and is easily removed, upon removal of frame 18, to increase the feed capacity of the device when desired, as in the case of mature or larger animals.

The frame 18 is vertically adjustable, upon loosening of the wing nuts of fasteners 22 at opposite ends of the device, to raise or lower the frame and thereby increase or decrease the effective height of side walls 12, 12, to accommodate the device to larger or smaller creatures. For example for feeding a brood of chicks the frame 18 might be moved to its extreme lower position in which walls 19, 19 are substantially co-extensive with container walls 12, 12, and as the chicks grow and develop the frame 18 may be raised so that the one device may serve the purpose heretofore served by several devices of different sizes.

It will be noted that the braces 23, which greatly rigidify the frame 18, are so disposed that they do not interfere with lowering of the frame even when the plate 24 is in place.

The reel 25, of spiral formation, affords feeding spaces between it and the container walls of varying width, as appears in Fig. 1, so as to accommodate, for example, chickens with large combs as well as those with smaller combs. The primary function of the reel is, of course, to prevent trampling of the feed within the container, it being rotatable so as not to afford a roost. The heads 27 on the ends of axle 26 of the reel are small enough to pass through bearing openings 15, 16 and 17, so that the reel may be adjusted vertically by being journalled in different bearing openings, although the heads 27 prevent accidental displacement of the spinner.

It will also be understood that the device illustrated and described is merely illustrative of the inventive principles involved and that the same may be applied and practiced in other forms without departing from the principles and scope of the invention.

I claim:

1. A feeder for fowl including a container having vertical sides and ends, the sides and ends forming a rectangle, a straight central shaft extending through the ends, bars secured to said shaft and extending substantially the full length thereof, the outer longitudinal edge of each bar having a spiral configuration with respect to said shaft, and the upper edges of the sides of said container being straight and parallel to said shaft.

2. The combination with a feed container having at least one vertical side and two ends, a rotatable reel mounted in the ends, said reel having bars with spiral edges, points on each spiral edge being at different distances from corresponding points on the upper edge of said side in planes normal to said side edge.

3. The combination with a feed container having a flat bottom and at least one vertical side and two ends, a rotatable reel mounted in the ends, said reel having bars with spiral edges, points on each spiral edge being at different distances from corresponding points on the upper edge of said side in planes normal to said side edge, and a removable plate positioned therein and having its central portion elevated and inclined with respect to the bottom of said container and its marginal edge portion resting upon said bottom and extending substantially into adjacency with said side and end walls to provide automatic self-centering of said plate upon disposition thereof within said container, said plate having points on its surface at different distances from corresponding points on each spiral edge in planes normal to said plate surface.

4. A feeder for poultry comprising a container having side and end walls, an integral continuous walled frame telescoping within said walls and vertically movable with respect thereto, said end walls being extended upwardly beyond the vertical limits of said side walls, elongated vertical slots in the upwardly extended portions of said end walls, fasteners carried by the frame and extending through said vertical slots for detachably locking said frame in various vertically adjusted positions relative to said container.

5. A feeder for poultry comprising a container having side and end walls, an integral continuous walled frame telescoping within said walls and vertically movable with respect thereto, said end walls being extended upwardly beyond the vertical limits of said side walls, elongated vertical slots in the upwardly extending portions of said end walls, fasteners carried by the frame and extending through said vertical slots for detachably locking said frame in various vertically adjusted positions relative to said container, and a vertically adjustable reel anti-roost rotatably mounted upon upper portions of said end walls, the outer longitudinal edges of the reel being of spiral form, whereby points on each spiral edge are at different distances from corresponding points on the upper edge of said frame wall portions in planes normal to said frame wall portions.

6. The combination with a feed container having at least one vertical side and two ends, a rotatable reel mounted in the ends, said reel having bars with spiral edges, points on each spiral edge being at different distances from corresponding points on the upper edge of said side in planes normal to said side edge, said reel being adjustable vertically with respect to said container.

DONALD S. GASKILL.